United States Patent
Fox et al.

(10) Patent No.: US 11,397,601 B2
(45) Date of Patent: *Jul. 26, 2022

(54) INTERFACE AND INTERRUPTION MANAGEMENT

(71) Applicant: International Business Machines Corporation, Armonk, NY (US)

(72) Inventors: Jeremy R. Fox, Georgetown, TX (US); Andrew R. Jones, Round Rock, TX (US); Balasubramanian Sivasubramanian, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 247 days.

This patent is subject to a terminal disclaimer.

(21) Appl. No.: 16/596,965

(22) Filed: Oct. 9, 2019

(65) Prior Publication Data

US 2020/0042337 A1   Feb. 6, 2020

Related U.S. Application Data

(63) Continuation of application No. 15/158,828, filed on May 19, 2016, now Pat. No. 10,521,255.

(51) Int. Cl.
*G06F 9/455* (2018.01)
*G06F 11/36* (2006.01)

(52) U.S. Cl.
CPC ...... *G06F 9/45525* (2013.01); *G06F 11/3664* (2013.01); *G06F 11/3696* (2013.01)

(58) Field of Classification Search
CPC .. G06F 9/445; G06F 11/3664; G06F 11/3696; G06F 9/45525
See application file for complete search history.

(56) References Cited

U.S. PATENT DOCUMENTS

| 6,119,186 A | 9/2000 | Watts |
|---|---|---|
| 7,076,445 B1 | 7/2006 | Cartwright |
| 8,152,641 B2 | 4/2012 | Hill |

(Continued)

FOREIGN PATENT DOCUMENTS

WO    2006052212 A1    5/2006

OTHER PUBLICATIONS

Business Process Intelligent enablement to handle failed events during Enterprise Applications, An IP.com Prior Art Database Technical Disclosure, Authors et al.: IBM, Original Publication Date: Nov. 15, 2005, IP.com No. PCOM000131690D, IP.com Electronic Publication Date: Nov. 15, 2005, 7 pages.

(Continued)

*Primary Examiner* — Wei Y Zhen
*Assistant Examiner* — Brahim Bourzik
(74) *Attorney, Agent, or Firm* — Stephanie L. Carusillo

(57) ABSTRACT

The method includes identifying, by one or more computer processors, a program being utilized by a user. The method further includes identifying, by one or more computer processors, an environmental factor related to a user of the program. The method further includes determining, by one or more computer processes, a relationship between the program and the environmental factor. The method further includes generating, by one or more computer processors, one or more instructions for the program based at least in part on the determined relationship and the environmental factor.

17 Claims, 5 Drawing Sheets

(56) References Cited

U.S. PATENT DOCUMENTS

| | | | |
|---|---|---|---|
| 8,176,206 B2 | 5/2012 | Eves | |
| 8,371,560 B2 | 2/2013 | Zhuo | |
| 8,635,278 B2 | 1/2014 | Stern | |
| 8,751,703 B2 | 6/2014 | Hatula | |
| 9,596,568 B1* | 3/2017 | Keller | H04N 21/42203 |
| 2007/0179646 A1 | 8/2007 | Dempski | |
| 2008/0127134 A1* | 5/2008 | Tirumalai | G06F 8/443 717/140 |
| 2008/0270661 A1 | 10/2008 | Plumpton | |
| 2011/0317712 A1 | 12/2011 | Mejdrich | |
| 2014/0046722 A1 | 2/2014 | Rosenbloom | |
| 2014/0100030 A1* | 4/2014 | Burke | G07F 17/3204 463/31 |
| 2014/0128146 A1* | 5/2014 | Story, Jr. | A63F 13/00 463/23 |
| 2014/0371944 A1 | 12/2014 | Vadakkanmaruveedu | |
| 2015/0057830 A1 | 2/2015 | Slaby | |
| 2015/0094142 A1* | 4/2015 | Stafford | G06F 3/017 463/31 |
| 2015/0355716 A1* | 12/2015 | Balasubramanian | G06F 3/04883 345/173 |
| 2017/0178260 A1 | 6/2017 | Wilde | |
| 2017/0332347 A1* | 11/2017 | Boss | H04W 68/005 |
| 2018/0082477 A1 | 3/2018 | Wilde | |
| 2018/0373411 A1 | 12/2018 | Wilde | |
| 2022/0129362 A1* | 4/2022 | Beijbom | G06F 11/3664 |

OTHER PUBLICATIONS

Mell et al., "The NIST Definition of Cloud Computing", Recommendations of the National Institute of Standards and Technology, NIST Special Publication 800-145, Computer Security Division, Information Technology Laboratory, Baithersburg, MD 20899-8930, Sep. 2011, 7 pages.

Method for interrupt moderation, An IP.com Prior Art Database Technical Disclosure, Authors et. al.: Disclosed Anonymously, IP.com No. IPCOM000009607D, IP.com Electronic Publication Date: Sep. 4, 2002, 7 pages.

Software Application Integration Framework (SAIF) Flexible Configuration, An IP.com Prior Art Database Technical Disclosure, Authors et. al.: Disclosed Anonymously, IP.com No. IPCOM000207361D, IP.com Electronic Publication Date: May 27, 2011, 5 pages.

"IBM Appendix P—List of IBM Patents or Patent Applications Treated as Related", Oct. 9, 2019, 2 Pages.

* cited by examiner

INTERFACE AND INTERRUPTION MANAGEMENT

BACKGROUND OF THE INVENTION

The present invention relates generally to monitoring a user environment, and more particularly to modifying a program based upon changes in the environment of the user.

The world of user applications has evolved recently. Previously, applications were designed for single users with a singular objective. The Internet revolutionized the application industry through providing real team interaction with other users across a global landscape. Further advancements in technology are trending towards higher amounts of connectivity and interaction at every layer. The future of the user interface lies with the evolution of hyper-connectivity and cutting age advancements to keep the user challenged and interested in usage. With the continued growth within the Internet of Things (IoT) industry, applications need to be able to work together in new ways creating more dynamic experiences.

SUMMARY

Aspects of the present invention disclose a method, computer program product, and system for modifying programs. The method includes identifying, by one or more computer processors, a program being utilized by a user. The method further includes identifying, by one or more computer processors, an environmental factor related to a user of the program. The method further includes determining, by one or more computer processes, a relationship between the program and the environmental factor. The method further includes generating, by one or more computer processors, one or more instructions for the program based at least in part on the determined relationship and the environmental factor.

DETAILED DESCRIPTION

Figure 1:
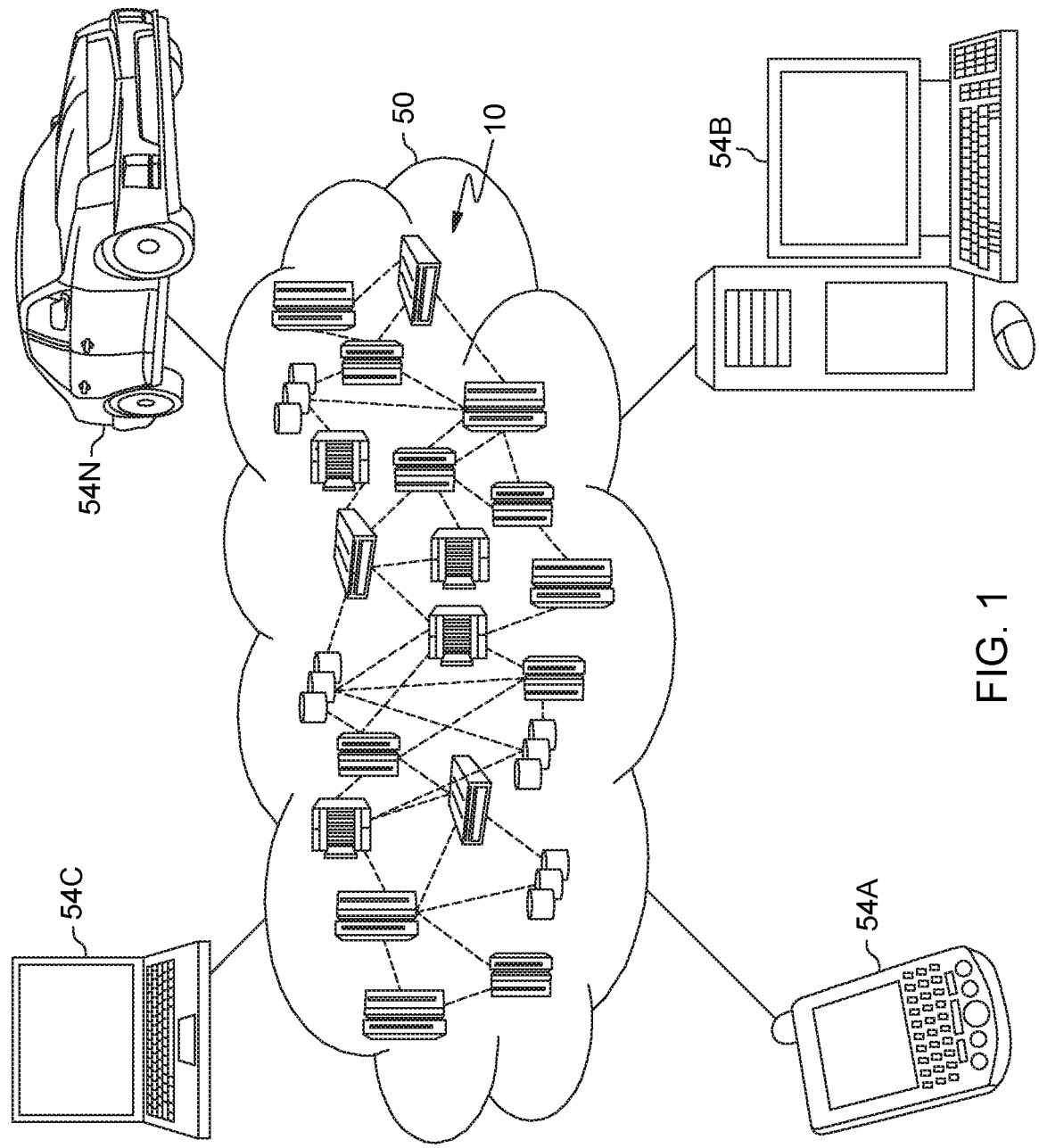
FIG. 1 depicts a cloud computing environment, in accordance with one embodiment of the present invention.

Embodiments of the present invention recognize that many applications require a certain level of dedicated attention. Interruptions of the user can prove to be challenging. Embodiments of the present invention recognize that real life interruptions can be implemented within the application, and future paths of the application modified.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. In some embodiments, node 10 may be computing device 104 or communicate with computing device 104 and computing device 102 of FIG. 3. The computing nodes 10 may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
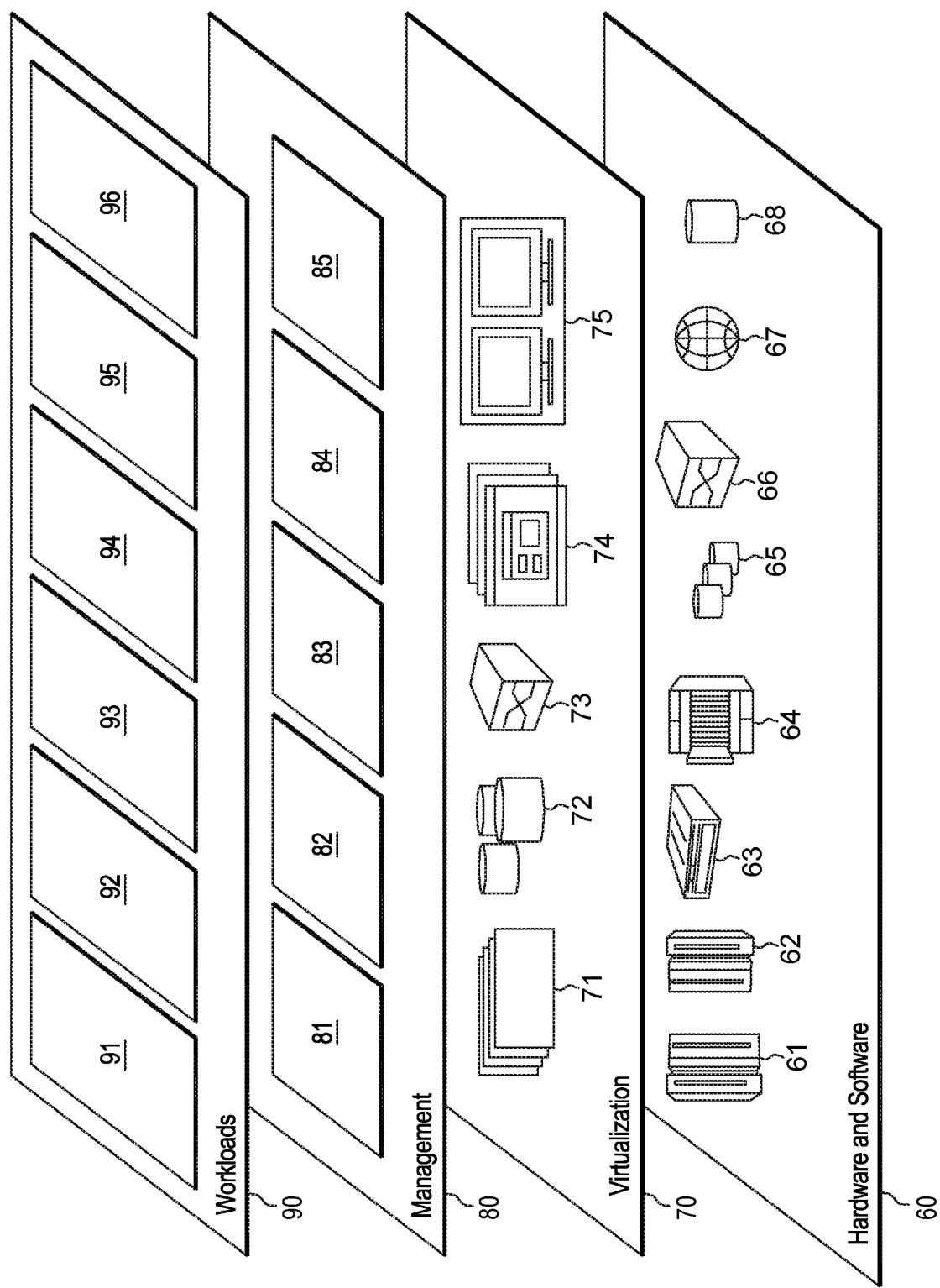
FIG. 2 depicts abstraction model layers, in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interruption management 96.

Implementation of embodiments of the invention may take a variety of forms, and exemplary implementation details are discussed subsequently with reference to the Figures.

Figure 3:
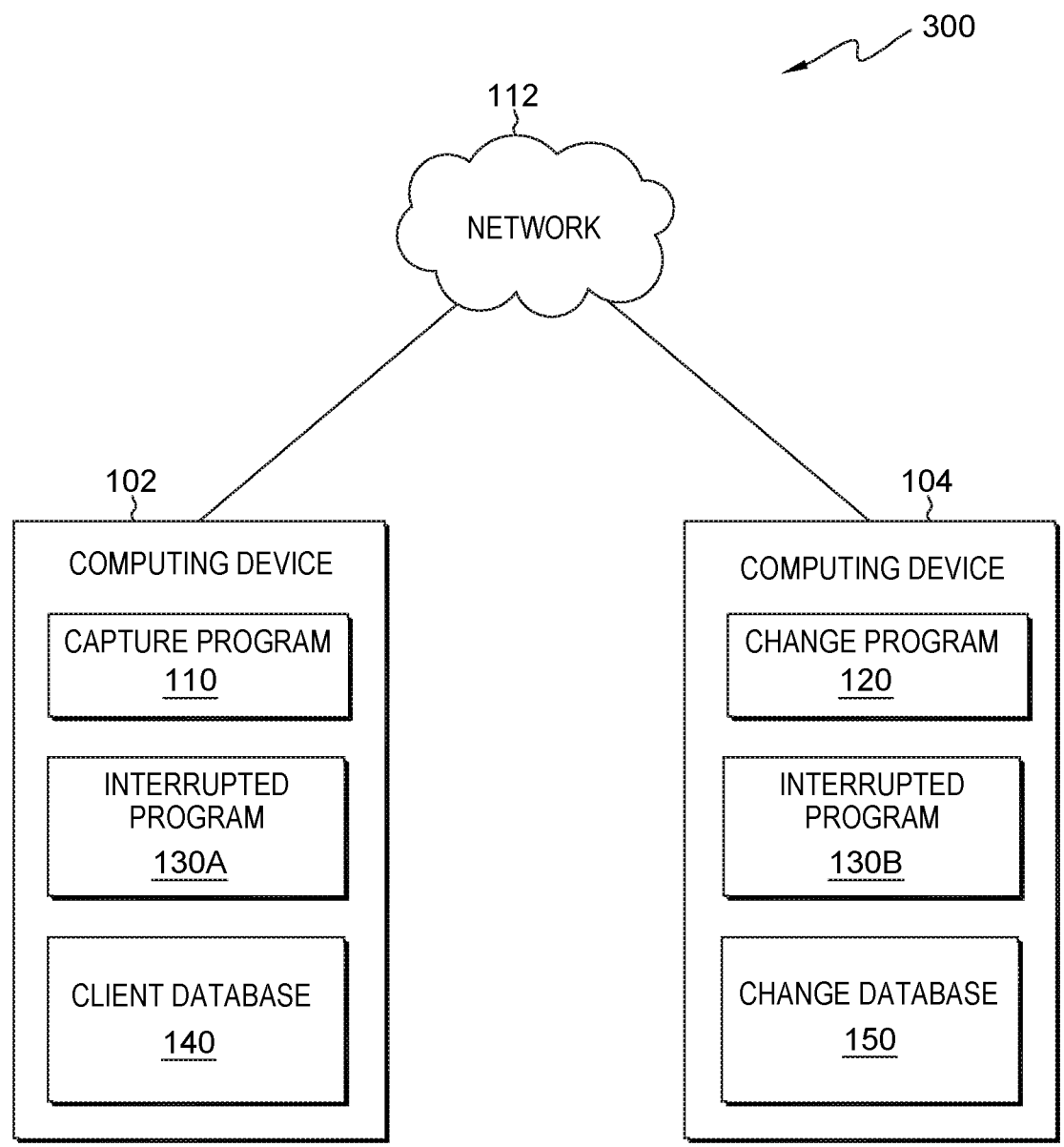
FIG. 3 is a functional block diagram illustrating a computing environment, in accordance with one embodiment of the present invention.

The present invention will now be described in detail with reference to the Figures. FIG. 3 is a functional block diagram of computing environment 300, in accordance with one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. In some embodiments, computing environment 300 may represent an Internet of Things environment, where interruptions can be managed through notification and possibly changing the state of the Internet of Things environment.

In the depicted environment, computing environment 300 includes computing device 102 and computing device 104 connected to network 112. Network 112 may be a local area network (LAN), a wide area network (WAN), such as the Internet, a cellular data network, any combination thereof, or any combination of connections and protocols that will support communications between computing device, in accordance with embodiments of the invention. Network 112 may include wired, wireless, or fiber optic connections. Network 112 includes one or more wired and/or wireless networks that are capable of receiving and transmitting data, voice, and/or video signals, including multimedia signals that include voice, data, and video information. Computing environment 300 may include other devices not shown that are able to communicate with computing device 102 and computing device 104 via network 112. Examples of other computing devices may include audio or visual receptors utilized to capture images, motion, and sound in computing environment 300.

Computing device 102 may be any computing device, such as a desktop computer, a laptop computer, a netbook computer, a gaming console, a wearable device, or a tablet computer. In general, computing device 102 may be any electronic device or computing system capable of processing program instructions, sending and receiving data and communicating to computing device 104 via network 112. In the depicted embodiment, computing device 102 contains capture program 110, interrupted program 130A, and client database 140. In some embodiments, computing device 102 may include additional programs, databases, or interfaces which are not depicted. Computing device 102, capture program 110, interrupted program 130A, client database 140, and any other programs not depicted are further described in FIG. 5.

In depicted computing environment 300, capture program 110 identifies activities occurring around a user of computing device 102. In various embodiments, capture program 110 may identify various sounds, visual cues, other programs running on computing device 102, user interfaces (e.g., a graphical user interface displaying images on computing device 102) on computing device 102 or other computing devices not depicted in computing environment 300. In an example, computing device 102 may have a microphone that detects noises occurring in proximity to computing device 102. For example, a microphone located on computing device 102 detects a phone ringing within audible range of computing device 102. In another embodiment, capture program 110 may be located on another computing device (not depicted) within computing environment 300 and send information to change program 120 located on computing device 104. In some embodiments, capture program 110 may be located on a computing device (not depicted) and send information to computing device 102 and computing device 104. In some embodiments, capture program 110 may be a subprogram or function of change program 120.

In some embodiments, a camera, a microphone, temperature sensors, infrared sensors, or any other device to determine audio or visual cues may be located in computing environment 300 and send data to capture program 110 that deciphers the incoming data. In some embodiments, capture program 110 may be located on computing device 104 and receive data from remote devices (e.g., microphones, motion detections devices, cameras, etc.) located within computing environment 100.

In depicted computing environment 300, interrupted program 130A may be any program employed by a user of computing device 102. In various embodiments, interrupted program 130A may be a program that is being actively utilized by a user of computing device 102, which can be modified by some means. In various embodiments, interrupted program 130A may be able to communicate with capture program 110, client database 140, change program 120, interrupted program 130B, change database 150, and any other programs or devices not depicted in computing environment 300. Interrupted program 130A may be a client side program that communicates with a server based program, such as interrupted program 130B. In an example, interrupted program 130B has a small amount of data stored on a client device (e.g., interrupted program 130A), which enables user interfaces on a computing device and various other functions, but the majority of data is stored on a server sided program such as interrupted program 130B. In other embodiments, interrupted program 130A may not require a server side (e.g., interrupted program 130B), but rather operate on a peer to peer network. In some embodiments, interrupted program 130A may be a subprogram or function of change program 120.

In various example, interrupted program 130A can be paused, muted, adjusted, or a future path of the program may be altered. For example, interrupted program 130A may be a video game that is actively being utilized by a user of computing device 102, at various points in interrupted program 130A multiple paths may be chosen for a character in the video game. In another example, interrupted program 130A may be a music playing program that contains a musical playlist and/or catalog. In the example, different songs may be selected to play. In yet another example, interrupted program 130A may be a texting program for a mobile device.

In depicted computing environment 300, client database 140 resides on computing device 102. Client database 140 may be a repository that may be written to and/or read by capture program 110, interrupted program 130A, change program 120, or interrupted program 130B. A database is an organized collection of data. In some embodiments, various user settings may be stored in client database 140. In various embodiments, client database 140 may contain noise identification, visual identification, and/or other identification criteria. In some examples, a user may store information such as the ringtone of a phone, a body shape, user feedback, etc. In other embodiments, client database 140 may reside on a server, another computing device (not depicted), or independently as a standalone database that is capable of communicating with computing device 102 via network 112.

Computing device 104 may be any computing device, such as a server computer, a desktop computer, a laptop computer, a netbook computer, a gaming console, a wearable device, or a tablet computer. In general, computing device 104 may be any electronic device or computing system capable of processing program instructions, sending and receiving data and communicating to computing device 102 via network 112. In an example, computing device 104 may be cloud computing node 10. In the depicted embodiment, computing device 104 contains change program 120, interrupted program 130B, and change database 150. In some embodiments, computing device 104 may be a server computer for hosting an online gaming network, movie database, music library, streaming services, etc. In an example, computing device 104 may have multiple consoles or computers that connect to computing device 104 via network 112 or any other method, and access interrupted program 130B and/or change program 120. In some embodiments, computing device 104 may include additions programs, databases, or interfaces which are not depicted. Computing device 104, change program 120, interrupted program 130B, change database 150, and any other programs not depicted are further described in FIG. 5.

In depicted computing environment 300, change program 120 receives inputs from the environment of a user of computing device 102 and modifies the users future path, selections, choices of interrupted program 130A and/or interrupted program 130B based upon the received inputs. In various embodiments, change program 120 may receive information from capture program 110, such as various sounds, visual cues, other programs running on computing device 102, user inputs etc. Change program 120 receives the inputs from the environment of the user and modifies interrupted program 130B and/or interrupted program 130A based upon the received inputs from the environment of the user. In some embodiments, change program 120 may have user preset selections based on interruptions or environmental factors observed by capture program 110. Change program 120 may pick different paths, or input different stimuli based upon the users preselected options for received information. In other embodiments, change program 120 may try to imitate the environment of a user based upon received information. For example, if a user's phone rings in real life, change program 120 may create and deploy instructions for a phone to ring in a video game being played by the user of interrupted program 130A and/or interrupted program 130B.

In depicted computing environment 300, interrupted program 130B may be a server based program accessed by multiple clients (e.g., a movie database, a music database, a video game, etc.). In various embodiments, interrupted program 130B may be a program that is actively employed by one or more users (e.g., the user of computing device 102), and the program can be modified by some means. In various embodiments, interrupted program 130B may be able to communicate with capture program 110, client database 140, change program 120, interrupted program 130A, change database 150, and any other programs or devices not depicted in computing environment 300. Interrupted program 130B may be a server side program that communicates with a multiple client based programs, such as interrupted program 130A. In other embodiments, interrupted program 130B may not require a client based program (e.g., interrupted program 130A), but rather interrupted program 130B may operate on a server that hosts a Web browser based program, which does not require a user to have a client version. In some embodiments, interrupted program 130B may be a subprogram or function of change program 120.

In various examples, interrupted program 130B can be paused, muted, adjusted, or a future path of interrupted program 130B may be altered. For example, interrupted program 130B may be a video game that is actively being utilized by one or more users, and at various points in interrupted program 130B multiple paths may be chosen for a character in the video game. In another example, interrupted program 130B may be a music playing program that contains a musical playlist and/or catalog. In the example, different songs may be selected to play. In yet another example, interrupted program 130B may be a texting program for a mobile device.

In depicted computing environment 300, change database 150 resides on computing device 104. Change database 150 may be a repository that may be written to and/or read by change program 120, interrupted program 130B, capture program 110, or interrupted program 130A. A database is an organized collection of data. In some embodiments, various user settings may be stored in change database 150. In various embodiments, change database 150 may contain noise identification, visual identification, and/or other identification criteria. In some examples, a user may store information such as the ringtone of a phone, a body shape, user feedback, etc. In yet other examples, change database 150 may contain specific options that are selectable for each program that change program 120 can alter. For example, change program 120 may be able to alter 5 programs employed by a specific user (e.g., interrupted program 130B). In the example, interrupted program 130B is a music player containing multiple playlists and catalogs of music. Change database 150 stores information regarding change program and the types of selections change program 120 may be able to alter based upon received inputs (change playlists, pause a song, skip a song, change an artist, play songs with raining noises, play songs that refer to a name, etc.) In other embodiments, change database 150 may reside on a personal computer, another computing device (not depicted), or independently as a standalone database that is capable of communicating with computing device 104 via network 112.

Figure 4:
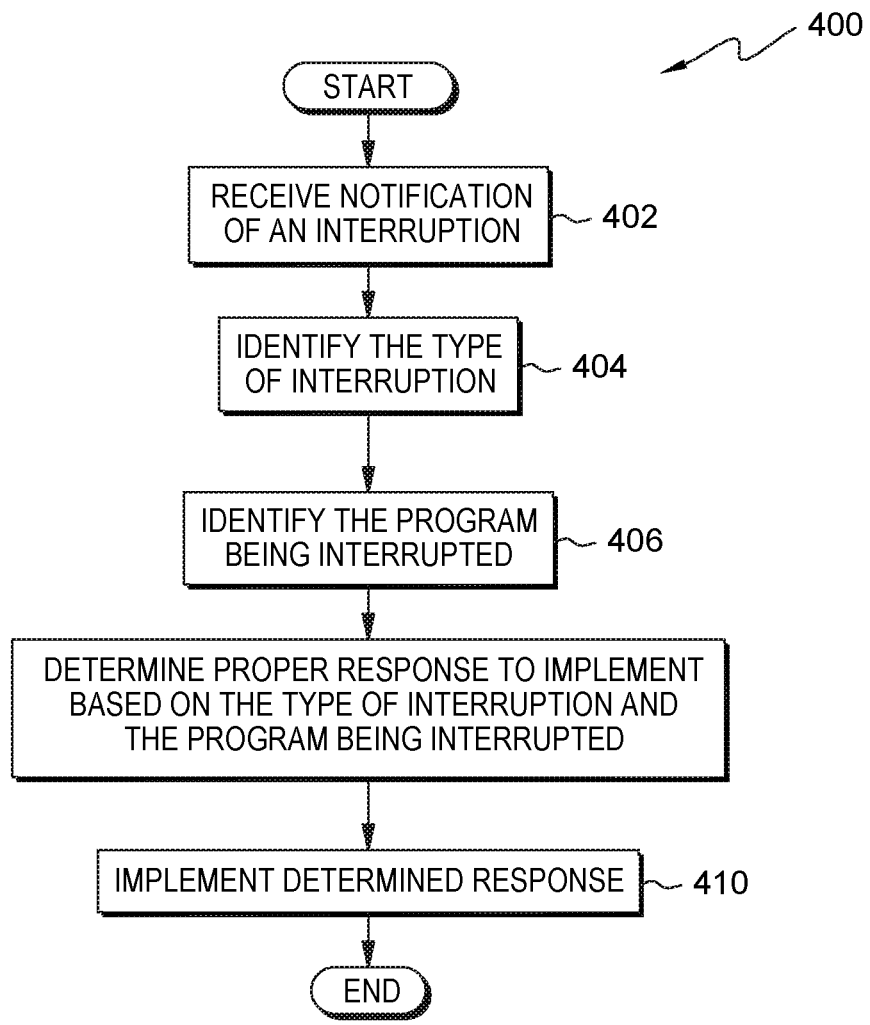
FIG. 4 depicts a flowchart depicting operational steps of modifying a program currently being utilized, executing within the computing environment of FIG. 3, in accordance with one embodiment of the present invention.

FIG. 4 is a flowchart depicting operational steps of program 400, which is a function of change program 120, in accordance with an embodiment of the present invention. The steps of program 400 may happen in another order. Some steps depicted in FIG. 4 may be skipped and other steps may be added. In some embodiments, the operational steps of program 400 begin in response to receiving data indicating environmental inputs related to a user of a program (e.g., interrupted program 130A and/or interrupted program 130B). In other embodiments, the operational steps of program 400 begin in response to a user activating program 400. In some embodiments, a user may have preset timeframes for program 400 to begin. In yet other embodiments, program 400 begins in response to identifying environmental factors related to a user of program 400.

Program 400 receives notification of an interruption (step 402). In some embodiments, an interruption may be an environmental factor related to a user of a managed program (e.g., interrupted program 130A). Examples of environmental factors can range from social media posts, to current weather, to political situations, to a person walking into a room with the user, to a phone ringing in the vicinity of the user, etc. In various embodiments, program 400 receives notifications of an interruption to a user of a program that program 400 monitors. An interruption does not have to actually interrupt a user of interrupted program 130A and/or 130B, but rather some change to the environment of the user. For example, program 400 monitors a gaming console that is actively being utilized (e.g., a user is playing a video game). Program 400 receives data indicating a ringing doorbell in the same house as the game console. In another example, program 400 receives an indication that interrupted program 130A has lost connectivity to program 130B.

In various embodiments, program 400 may receive data regarding audio, video, motion sensing, electrical or any other type of data that may cause an interruption to a user of a program being monitored (e.g., interrupted program 130A). In one example, a user is watching a movie and a person walks between the user and the display. Program 400 receives data indicating that the view of the user is blocked. In another example, program 400 receives data indicating the amount of people in a room. In another example, program 400 receives data indicating a setting (e.g., the dimensions of a room) and the features of the setting (e.g., furniture, appliances, people, pets, etc.). In yet another example, program 400 may receive data indicating the current weather in the location of a user of the program being monitored. In various embodiments, program 400 actively monitors computing environment 300 to identify environmental factors. In some embodiments, program 400 may receive data from a capture program (e.g., capture program 110). In an example, the capture program 110 is a camera and identifies a person is smoking in the vicinity of the user of interrupted program 130A. Capture program 110 sends data indicating that smoke is in the room and that the smoke is coming from a cigarette of a person five feet from the user of interrupted program 130A. In some embodiments, program 400 may search for current events, weather, political changes, news stories, sporting events, etc., which program 400 may incorporate into the program being monitored.

Program 400 identifies the type of interruption (step 404). In various embodiments, program 400 identifies the type of interruption based upon the received data from step 402. In an example, program 400 identifies the surroundings of a user of interrupted program 130A based upon the received data and identifies if any of the surroundings may interrupt the user of interrupted program 130A. For example, program 400 may receive multiple indications of events occurring around a user of interrupted program 130A, such as someone talking in the background and a phone ringing, and program 400 determines that the background talking is not distracting the user, but the phone ringing is the phone of the user.

In various embodiments, program 400 identifies and catalogs each noise, movements, etc. In one example, program 400 identifies a bird chirp. Program 400 identifies the type of bird that made the noise. Program 400 also identifies the location of the bird via triangulation of microphones and the sound. In another example, program 400 identifies five people in the same room as the user of interrupted program 130A. Person 1 is texting on the phone of person 1. Program 400 identifies the name of the person via previous gaming profiles via a visual monitoring system. In yet another example, four users of interrupted program 130A are playing a video game. One of the users gets off the couch to go into the kitchen and eat some food. Program 400 receives data indicating that a user has walked into the kitchen and is eating food in step 402, and program 400 identifies which user of the four users is eating food in the kitchen and identifies the type of food the user is consuming. In an example, program 400 receives an indication that a television is on and program 400 is receiving visual and audio data in step 402. Program 400 then identifies the subject matter of the visual and audio data. In an example, program 400 identifies that a star football running back was just injured and will be out for the remainder of the football game. Program 400 may be able to implement the same action in a video game currently being played by the user of interrupted program 130A.

Program 400 identifies the program being interrupted (step 406). In various embodiments, program 400 identifies the program or programs being interrupted by the received and identified data. For example, a user may be playing a video game and listening to music at the same time. Program 400 identifies each program, such as a video game console including the game being played currently and a smart phone playing music including the song being played currently. In some embodiments, program 400 may identify only one program being employed by a user, (e.g., interrupted program 130A). In other embodiments, program 400 may identify multiple programs being utilized by a user. In yet some other embodiments, program 400 may not identify any program being utilized currently, but program 400 may store (e.g., store the information in change database 150) the identified information from steps 402 and 404 for later use when a user turns on a program that program 400 can interact with.

Program 400 determines the proper response to implement based on the type of interruption and the program being interrupted (step 408). In various embodiments, program 400 determines the amount of time the interruption has been occurring. For example, program 400 may have received data indicating a conversation has been occurring between a user of interrupted program 130A and another person for five minutes. In another example, program 400 determines that a rain storm has been occurring for an hour. Program 400 catalogs the environmental factor of rain for the last hour, but at some point the rain will stop in this example and the original state or a new state will be introduced, such as fog rolls in after the rain. In yet another example, program 400 determines that a phone just began to ring. In some embodiments, program 400 determines the proper response from a list of possible responses based upon the identified interrupted program (e.g., interrupted program 130A and/or interrupted program 130B). In an example, a user may have preselected possible responses for various programs based upon the interruption and the program being interrupted. For example, a user of program 400 presets responses for a video gaming system (e.g., if a program 400 receives data indicating a phone ringing in the vicinity of the user, then program 400 should create instructions for the video gaming system to have a phone ringing in the video game provided a phone is present in the video game). In some examples, program 400 may present a user with a list of options to implement based upon possible received inputs. User selections may be stored in change database 150, client database 140, or any other database provided program 400 can access the database via network 112.

In some embodiments, program 400 determines the relationship between the program being interrupted and the environmental factors related to a user of the program. For example, program 400 determines that the user has answered a phone, and phones are in the game being played by the user. Program 400 identifies the type of environmental factor (e.g., pet, weather, phone call, person entering a room, etc.) and determines if there is a relationship between the environmental factor and the program currently being utilized. For example, program 400 determines if a similar environmental factor exists in the program being utilized, and if the environmental factor can interact with the in-game player in a similar manner to the real life environmental factor and the user of the interrupted program. In some embodiments, program 400 may determine possible alternate future options for a program being interrupted. For example, program 400 identifies a video game can introduce a various new characters, change the background music between 5 different tracks, change the weather depending on the season, change food being cooked to different types of meat, etc. Program 400 determines that an environmental factor of a microwave beeping equates to a character in a video game needing more food to survive (e.g., the player and user are both hungry). Previously, the character in the video game was not hungry, but hunger is one of the alternate future paths in the game. Based on the sounds of the microwave, program 400 determines that food is being cooked, and therefore, changing the characters hunger level in the game mimics the users current hunger status. In some embodiments, program 400 may determine that an environmental factor is similar to an item in a virtual world by pattern recognition (e.g., a cat is a pet, a soda is a beverage, etc.), shape comparison, audio comparison, etc. In some other embodiments, program 400 may identify features in a virtual environment (e.g., the environment created by interrupted program 130A) that are able to change, and determine if there are similar objects in the physical environment of the user.

In some embodiments, program 400 may create a score for a relationship. For example, program 400 may determine the similarity of images between captured image from capture program 110 and an image in a game. Program 400 may perform an image overlay, compare facial points, etc. to calculate the similarity of images. In other embodiments, program 400 may assign points for environmental factors that can be mimicked in a game. For example, capture program 400 determines that the weather is sunny in the vicinity of the user, and interrupted program 130A and interrupted program 130B have a weather component. Program 400 determines that the relationship is 1 to 1 (i.e., the program can identically mimic reality.) In various embodiments, program 400 may create a relationship score, which has to exceed a threshold for program 400 to implement the environmental factor in the program.

In some embodiments, program 400 may utilize cognitive functions which determine responses without user input. In an example, program 400 may incorporate self-learning at a system level and pattern recognition to enable program 400 to generate instructions for interrupted program 130A and interrupted program 130B. For example, program 400 identifies an interruption of a dog walking into a room. Program 400 may recognize that a dog gets fed every day at the same time via pattern recognition. Program 400 identifies the user of interrupted program 130A/130B is playing a game in which wild animals roam. Program 400 creates instructions for a wild animal to follow the user within the video game for the duration of the time the dog is in the room. Program 400 uses image recognition to identify a dog in the room and a similar image in the game (e.g., a dog). In some examples, program 400 may receive updated information regarding the proximity of the dog to the user of interrupted program 130A and create instructions for a wild animal within a video game to mimic the distance. In some embodiments, program 400 may determine that the interruption does not correlate to program being interrupted. For example, program 400 identifies the phone of the user of interrupted program 130A rang and the user answered the phone. The user is playing a medieval game, and therefore, a phone does not exist within the setting of the game. Program 400 may create instructions for a person to approach the user of interrupted program 130A within game play and begin talking to the user within game play. In some embodiments, decisions are made by program 400 to accommodate the type of interruption in relation to the scope and content of the user's environment. In some examples, program 400 may utilize previous user input to develop a likely response, and create decisions based upon past user actions.

In other embodiments, program 400 may create instructions to pause the interrupted program (e.g., a game, movie, music, etc.). In some embodiments, a user may preselect certain actions to be taken based upon the time of the interruption and predefined configurations and settings thereof. For example, if the user of interrupted program 130A takes a phone call, program 400 pauses the interrupted program upon the first ring, however, if the user proceeds to speak on the phone for more than 30 seconds program 400 may then create instructions to simulate the phone call within the interrupted program. For example, a user is listening to music and receives a phone call, program 400 may initially pause the music, but after 30 seconds resume the music but at a lower volume, and select songs that mention telephone calls, or words being discussed in the conversation of the user.

In an example, program 400 identified a short interruption of a user of interrupted program 130A (e.g., a user receives a phone call, reads a text message, listens to a voice mail, interacts with social media, gets up to grab a snack, answer the door, etc.). In the example, program 400 creates instructions to pause the game, provide no instructions, etc. In another example, interrupted program 130B is a multiplayer collaborative game. Program 400 identifies a short interruption and determines that the objective of the game is survival based. Program 400 creates instructions to the player that is interrupted to seek shelter and provide instructions to other players to cover the interrupted player as the player is not active.

In another example, program 400 identified an interruption of a user of interrupted program 130A (e.g., an upcoming known event the user has scheduled, such as on a calendar, based on a previously identified conversation of the user of interrupted program 130A, or any other methods known in the art). Program 400 may create instructions to pause, save, and/or change a future path of the program for an identified period of time based upon the identified data from step 402. For example, a user is watching a movie and the user's calendar reflects the user has a birthday party to attend at 4:00 P.M. Program 400 may pause the movie at 3:00 P.M. and begin playing birthday music.

In yet another example, program 400 identifies long term interruption of a user of interrupted program 130A (e.g., a user leaves the residence, a blizzard is occurring in the town of the user, a user posts on social media about having a child, etc.). Program 400 may create instructions to create long term changes to interrupted program 130A, such as change the weather in a video game from fall to winter conditions. A user of interrupted program 130A may then not be able to grow and harvest crops in a farming video game because winter is coming.

Program 400 implements the determined response (step 410). In some embodiments, program 400 implements a response that best mimics the physical environment of the user of the interrupted program (e.g., interrupted program 130A). In various embodiments, program 400 sends instructions to the interrupted program (e.g., interrupted program 130A) based upon the determined response from step 408. In some examples, program 400 creates universal instructions which can be implemented by multiple programs, and sends the universal instructions to the interrupted program. In other examples, program 400 creates instructions for a specific interrupted program and sends the specific instructions to the interrupted program. In various embodiments, program 400 may identify the type of code of the identified interrupted program and generate instructions specifically for the interrupted program. In other embodiments, program 400 may generate generic commands for the interrupted program, which may or may not be utilized by the interrupted program. In some embodiments, program 400 may have a list of possible program instructions to choose from that are provided by the interrupted program. Program 400 may select the closest program instructions to the determined response in step 408, thereby replicating the physical environment of the user in a virtual environment of the interrupted program.

The following is a detailed example of operation of program 400. A user is playing interrupted program 130A, a first person video game. Capture program 110 is monitoring activities occurring in the same room as the user. A person other than the user walks into the same room as the user. Capture program 110 sends data to program 400 containing a location of the user and the other person in the room, the conversation taking place and any other information capture program 110 can provide (e.g., the identity of the other person, the attire of the other person, any activities the other person is performing, etc.). Program 400 receives data indicating the user of interrupted program 130A has been interrupted. Program 400 then identifies the type of interruption based upon the received data, therefore, program 400 identifies that the user is conversation with another person in the room and the person has walked into the room and is sitting on a couch next to the user. Program 400 then identifies the type of program being interrupted, therefore, program 400 identifies that the user is playing a first person video game set in an open world. Program 400 then determines the proper response based upon the identified interruption and program being interrupted. Program 400 determines that the first person video game set in an open world does not have humanoid characters, but there are various animals that can interact with the user. Program 400 identifies the type of commands utilized in the video game. Program 400 then generates program instructions for the video game that send an animal to interact with the user. If the animal can converse with the user, program 400 may take cues from the conversation currently taking place between the user and other person to try to mimic the conversations. Program 400 then sends the generated program instructions to interrupted program 130A for implementation.

Figure 5:
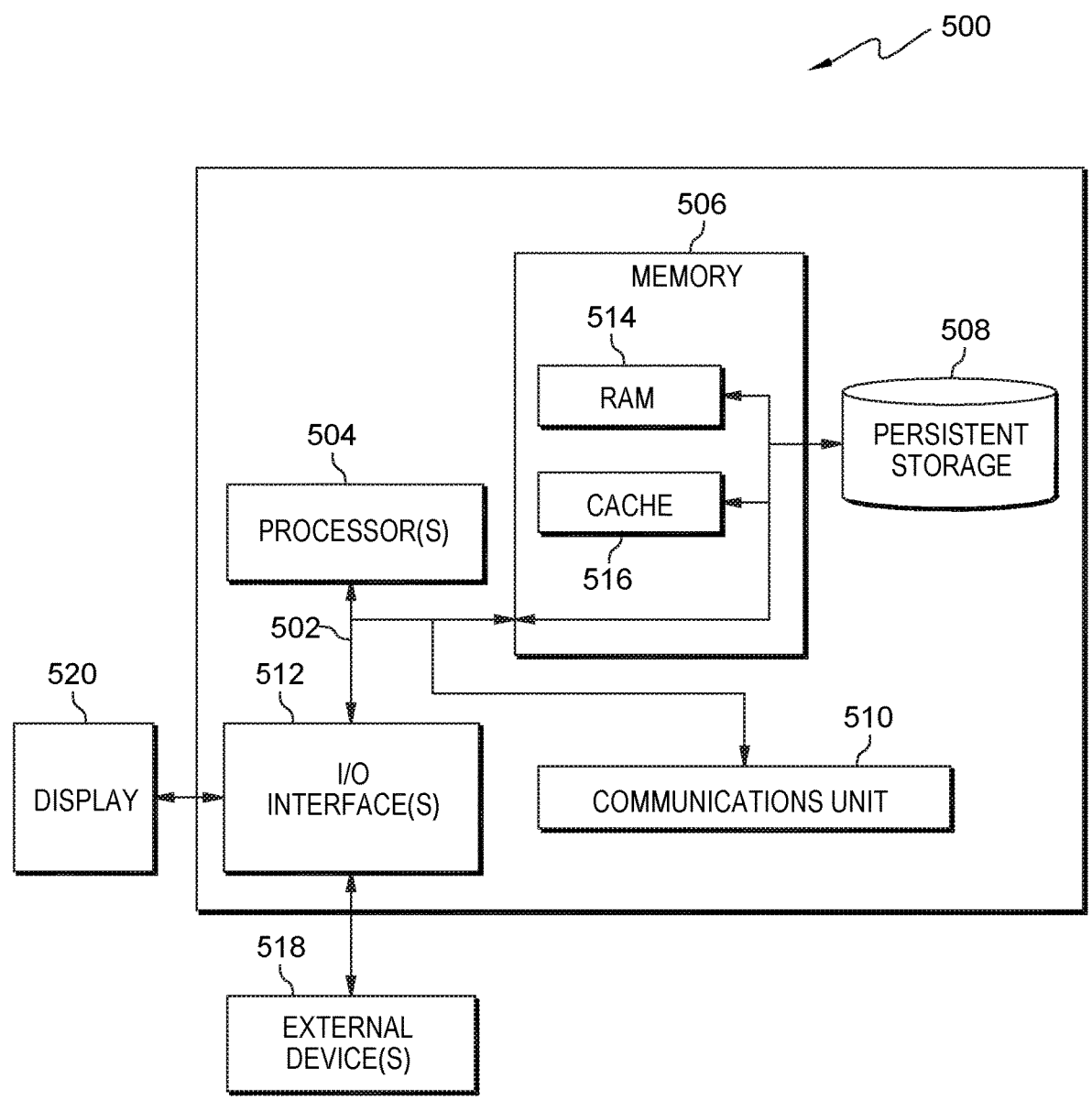
FIG. 5 depicts a block diagram of components of the computing device of FIG. 3, in accordance with another embodiment of the present invention.

FIG. 5 depicts a block diagram of components of computing device 500 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made. Computing device 500 may be one or more of computing device 102 and/or computing device 104 or any other computing device from computing environment 300 not depicted.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM) 514. In general, memory 506 can include any suitable volatile or non-volatile computer readable storage media. Cache 516 is a fast memory that enhances the performance of computer processor(s) 504 by holding recently accessed data, and data near accessed data, from memory 506.

Capture program 110, interrupted program 130A, client database 140, change program 120, interrupted program 130B, and change database 150 may be stored in persistent storage 508 and in memory 506 for execution and/or access by one or more of the respective computer processor(s) 504 via cache 516. In an embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Capture program 110, interrupted program 130A, client database 140, change program 120, interrupted program 130B, and change database 150 may be downloaded to persistent storage 508 through communications unit 510.

I/O interface(s) 512 allows for input and output of data with other devices that may be connected to computing device 500. For example, I/O interface(s) 512 may provide a connection to external device(s) 518, such as a keyboard, a keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., capture program 110, interrupted program 130A, client database 140, change program 120, interrupted program 130B, and change database 150, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for modifying programs, the method comprising: determining, by one or more computer processors, a relationship between a program and a change of an environmental factor related to a user of the program within a vicinity of the user;

based on the determined relationship between the program and the change of the environmental factor, creating, by the one or more computer processors, a relationship score, wherein the relationship score indicates a calculated similarity between an image captured from a physical environment of the user and an image in the program;

determining, by the one or more computer processors, that the relationship score exceeds a threshold of the calculated similarity;

responsive to determining the relationship score exceeds the threshold of the calculated similarity, identifying, by the one or more computer processors, one or more alternate future program instructions that the program can follow;

determining, by the one or more computer processors, a program instruction incorporating a change in a virtual environment that imitates the change of the environmental factor from the one or more alternate future program instructions based upon the determined relationship and the change of the environmental factor; and generating, by the one or more computer processors, the determined program instructions for the program based at least in part on the determined relationship and the change of the environmental factor.

2. The method of claim 1, further comprising sending the generated instructions to the program.

3. The method of claim 1, wherein, the change of the environmental factor comprises one or more of an audio and a visual change to the physical environment surrounding the user.

4. The method of claim 1, wherein generating the determined program instructions for the program comprises: identifying, by the one or more computer processors, a preselected instruction for the program based upon the change of the environmental factor, wherein the preselected instruction for the program is selected based upon a similarity of the relationship between the change of the environmental factor and the preselected instruction for the program; and generating, by the one or more computer processors, the one or more alternate future program instructions for the program based upon the preselected instruction for the program.

5. The method of claim 1, wherein generating the determined program instructions for the program comprises: identifying, by the one or more computer processors, one or more details related to a virtual environment produced by the program; determining, by the one or more computer processors, whether the environmental factor is similar to one or more details related to the virtual environment; and in response to determining that the environmental factor is similar to one or more details related to the virtual environment, generating, by the one or more computer processors, the one or more alternate future program instructions for the program to replicate the environmental factor in the virtual environment.

6. The method of claim 1, wherein determining the relationship between the program and the change of the environmental factor comprises:
identifying, by the one or more computer processors, one or more details related to a virtual environment produced by the program; and determining, by the one or more computer processors, whether the environmental factor can be replicated in the virtual environment produced by the program.

7. A computer program product for modifying programs, the computer program product comprising: one or more computer readable storage media and program instructions stored on the one or more computer readable storage media, the program instructions comprising:
program instructions to determine a relationship between a program and a change of an environmental factor related to a user of the program within a vicinity of the user;
based on the determined relationship between the program and the change of the environmental factor, program instructions to create a relationship score;
wherein the relationship score indicates a calculated similarity between an image captured from a physical environment of the user and an image in the program;

program instructions to determine that the relationship score exceeds a threshold of the calculated similarity;
responsive to determining the relationship score exceeds the threshold of the calculated similarity, program instructions to identify one or more alternate future program instructions that the program can follow;
program instructions to determine a program instruction incorporating a change in a virtual environment that imitates the change of the environmental factor from the one or more alternate future program instructions based upon the determined relationship and the environmental factor; and
program instructions to generate the determined program instructions for the program based at least in part on the determined relationship and the change of the environmental factor.

8. The computer program product of claim 7, further comprising program instructions to send the generated instructions to the program.

9. The computer program product of claim 7, wherein, the change of the environmental factor comprises one or more of an audio and a visual change to the physical environment surrounding the user.

10. The computer program product of claim 7, wherein program instructions to generate the determined program instructions for the program comprises program instructions to: identify a preselected instruction for the program based upon the change of the environmental factor, wherein the preselected instruction for the program is selected based upon a similarity of the relationship between the change of the environmental factor and the preselected instruction for the program; and generate the one or more alternate future program instructions for the program based upon the preselected instruction for the program.

11. The computer program product of claim 7, wherein program instructions to generate the determined program instructions for the program comprises program instructions to: identify one or more details related to a virtual environment produced by the program; determine whether the environmental factor is similar to one or more details related to the virtual environment; and in response to determining that the environmental factor is similar to one or more details related to the virtual environment, generate the one or more alternate future program instructions for the program to replicate the environmental factor in the virtual environment.

12. The computer program product of claim 7, wherein program instructions to determine the relationship between the program and the change of the environmental factor comprises program instructions to: identify one or more details related to a virtual environment produced by the program; and determine whether the environmental factor can be replicated in the virtual environment produced by the program.

13. A computer system for modifying programs, the computer system comprising: one or more computer processors; one or more computer readable storage media; program instructions stored on the computer readable storage media for execution by at least one of the one or more computer processors, the program instructions comprising:
program instructions to determine a relationship between a program and a change of an environmental factor related to a user of the program within a vicinity of the user;
based on the determined relationship between the program and the change of the environmental factor, program instructions to create a relationship score, wherein the relationship score indicates a calculated similarity between an image captured from a physical environment of the user and an image in the program; program instructions to determine that the relationship score exceeds a threshold of the calculated similarity; responsive to determining the relationship score exceeds the threshold of the calculated similarity, program instructions to identify one or more alternate future program instructions that the program can follow; program instructions to determine a program instruction incorporating a change in a virtual environment that imitates the change of the environmental factor from the one or more alternate future program instructions based upon the determined relationship and the environmental factor; and program instructions to generate the determined program instructions for the program based at least in part on the determined relationship and the change of the environmental factor.

14. The computer system of claim 13, further comprising program instructions to send the generated instructions to the program.

15. The computer system of claim 13, wherein program instructions to generate the determined program instructions for the program comprises program instructions to: identify a preselected instruction for the program based upon the change of the environmental factor, wherein the preselected instruction for the program is selected based upon a similarity of the relationship between the change of the environmental factor and the preselected instruction for the program; and generate the one or more alternate future program instructions for the program based upon the preselected instruction for the program.

16. The computer system of claim 13, wherein program instructions to generate the determined program instructions for the program comprises program instructions to: identify one or more details related to a virtual environment produced by the program; determine whether the change of the environmental factor is similar to one or more details related to the virtual environment; and in response to determining that the change of the environmental factor is similar to one or more details related to the virtual environment, generate the one or more alternate future program instructions for the program to replicate the environmental factor in the virtual environment.

17. The computer system of claim 13, wherein program instructions to determine the relationship between the program and the change of the environmental factor comprises program instructions to: identify one or more details related to a virtual environment produced by the program; and determine whether the environmental factor can be replicated in the virtual environment produced by the program.

* * * * *